(12) United States Patent
Li et al.

(10) Patent No.: US 8,171,467 B1
(45) Date of Patent: May 1, 2012

(54) UPDATING OF MALICIOUS CODE PATTERNS USING PUBLIC DNS SERVERS

(75) Inventors: Jianda Li, San Jose, CA (US); Bharath Kumar Chandrasekhar, Santa Clara, CA (US); Kong Yew Chan, San Mateo, CA (US)

(73) Assignee: Trend Micro Incorporated, Tokyo (JP)

( * ) Notice: Subject to any disclaimer, the term of this patent is extended or adjusted under 35 U.S.C. 154(b) by 1336 days.

(21) Appl. No.: 11/825,256

(22) Filed: Jul. 3, 2007

(51) Int. Cl.
*G06F 9/44* (2006.01)
(52) U.S. Cl. .......................................... 717/171
(58) Field of Classification Search .................... 717/171
See application file for complete search history.

(56) References Cited

U.S. PATENT DOCUMENTS

| | | | |
|---|---|---|---|
| 6,725,377 B1 | 4/2004 | Kouznetsov | |
| 6,966,059 B1* | 11/2005 | Shetty et al. | 717/172 |
| 7,099,853 B1 | 8/2006 | Liu et al. | |
| 7,188,369 B2 | 3/2007 | Ho et al. | |
| 7,315,543 B2* | 1/2008 | Takeuchi et al. | 370/392 |
| 7,549,169 B1* | 6/2009 | Sobel et al. | 726/26 |
| 7,634,808 B1* | 12/2009 | Szor et al. | 726/22 |
| 7,984,493 B2* | 7/2011 | Jones | 726/12 |
| 2003/0229801 A1* | 12/2003 | Kouznetsov et al. | 713/200 |
| 2004/0233916 A1* | 11/2004 | Takeuchi et al. | 370/395.54 |
| 2005/0132179 A1* | 6/2005 | Glaum et al. | 713/1 |
| 2005/0149749 A1* | 7/2005 | Van Brabant | 713/200 |
| 2007/0033645 A1* | 2/2007 | Jones | 726/12 |
| 2007/0118669 A1* | 5/2007 | Rand et al. | 709/245 |
| 2008/0040710 A1* | 2/2008 | Chiriac | 717/136 |

OTHER PUBLICATIONS

DNS-based Detection of Scanning Worms in an Enterprise Network; Whyte et al; Carleton University; Feb. 2005.*
The Domain Name Service as an IDS How DNS can be used for detecting and monitoring badware in a network; Schonewille et al; University of Amsterdam; Feb. 2006.*
Fully Qualified Domain Name—Wikipedia, the free encyclopedia, May 19, 2007, pp. 2, [retrieved on Jun. 7, 2007]. Retrieved from the internet<http://en.wikipedia.org/wiki/FQDN>.

* cited by examiner

*Primary Examiner* — Wei Zhen
*Assistant Examiner* — Junchun Wu
(74) *Attorney, Agent, or Firm* — Okamoto & Benedicto LLP

(57) ABSTRACT

Malicious code patterns of an antivirus may be updated using public DNS (domain name system) servers. An update to the malicious code patterns may be generated and divided into several portions for inclusion in DNS records. The DNS records may be published for caching in public DNS servers. An update client in a client computer may send out DNS queries to receive contents of the DNS records, which include the portions of the update. The update client may combine the portions to update the malicious code patterns in the client computer.

13 Claims, 5 Drawing Sheets

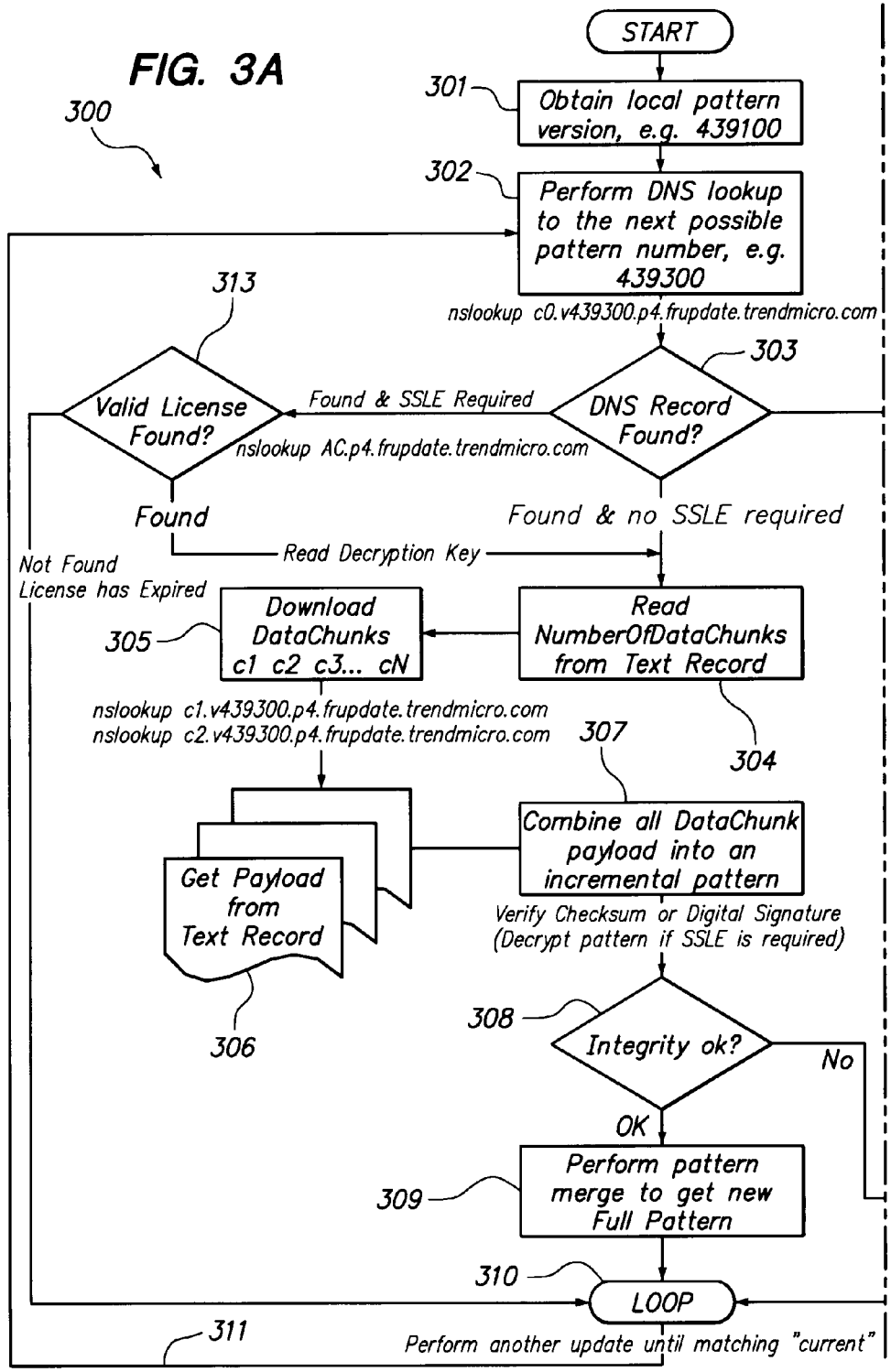

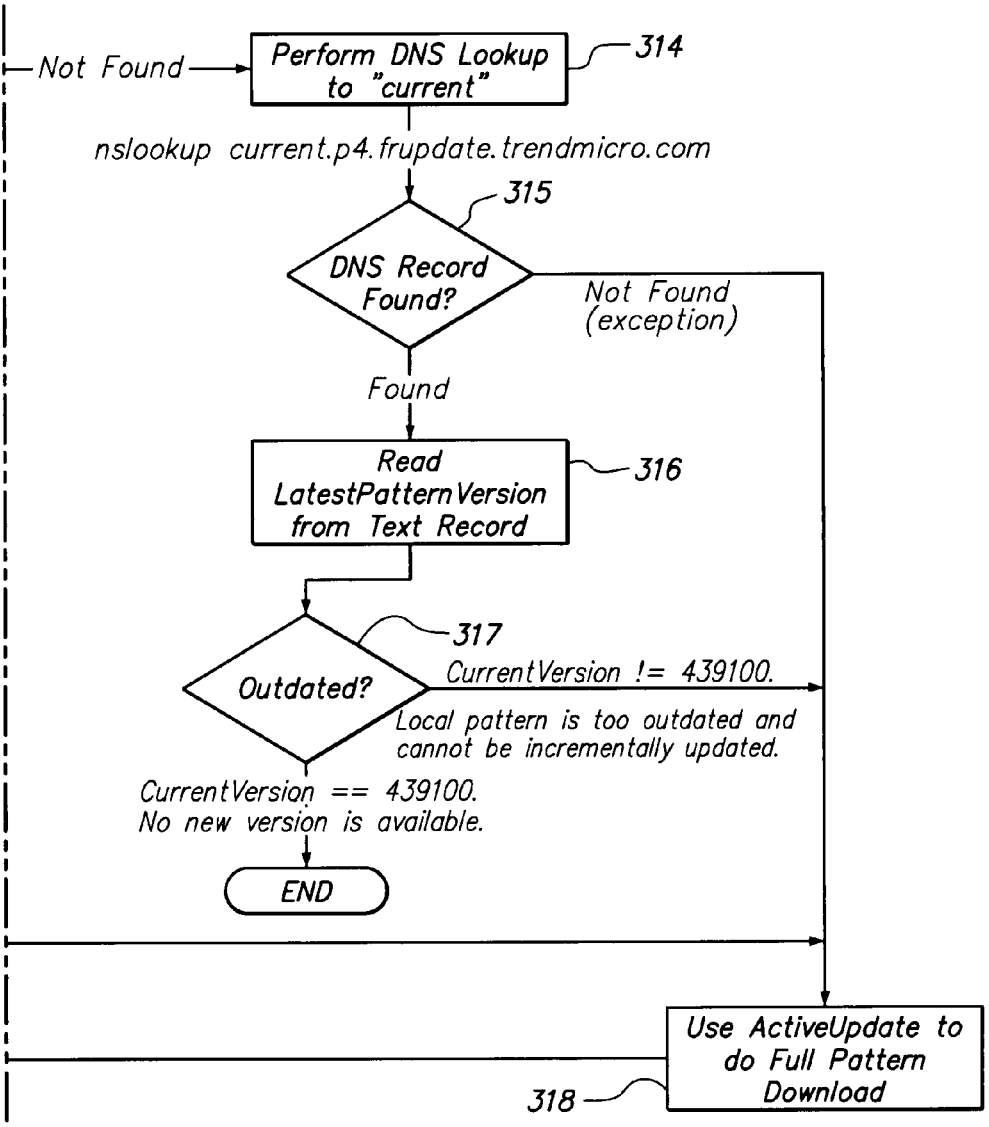

UPDATING OF MALICIOUS CODE PATTERNS USING PUBLIC DNS SERVERS

BACKGROUND OF THE INVENTION

1. Field of the Invention

The present invention relates generally to computer security, and more particularly but not exclusively to methods and apparatus for distributing malicious code patterns.

2. Description of the Background Art

Computer viruses, worms, Trojans, rootkits, and spyware are examples of malicious codes that have plagued computer systems throughout the world. Malicious codes, which are also collectively referred to simply as "viruses," may be detected using antivirus techniques implemented in software, hardware, or a combination of hardware and software. An antivirus may employ a scan engine and malicious code patterns. To scan data for malicious codes, the scan engine compares the content of the data to the malicious code patterns using a pattern matching algorithm. The data is deemed infected if a match is found. In that case, various cleaning steps may be performed to prevent the malicious code from proliferating including quarantine, disinfection, removal, alerting the user or administrator, and so on.

Malicious code patterns are periodically updated to include the latest information on known malicious codes. Malicious code pattern updates may be performed by FTP (file transfer protocol) or HTTP (hypertext transfer protocol). Although effective and may be used in conjunction with embodiments of the present invention, pattern update by FTP or HTTP requires special infrastructure and involves considerable cost on the part of the computer security vendor providing the antivirus. This increases the cost of the antivirus, which is passed on to the consumer. What is needed is a low cost and reliable pattern update service.

SUMMARY

Malicious code patterns of an antivirus may be updated using public DNS (domain name system) servers. An update to the malicious code patterns may be generated and divided into several portions for inclusion in DNS records. The DNS records may be published for caching in public DNS servers. An update client in a client computer may send out DNS queries to receive contents of the DNS records, which include the portions of the update. The update client may combine the portions to update the malicious code patterns in the client computer.

These and other features of the present invention will be readily apparent to persons of ordinary skill in the art upon reading the entirety of this disclosure, which includes the accompanying drawings and claims.

DESCRIPTION OF THE DRAWINGS

FIG. 3, which consists of FIGS. 3A and 3B, shows a flow diagram of a method of obtaining updated malicious code patterns for an antivirus in accordance with an embodiment of the present invention.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Software components may be implemented in logic circuits, for example. Components may be implemented separately in multiple modules or together in a single module.

Figure 1:
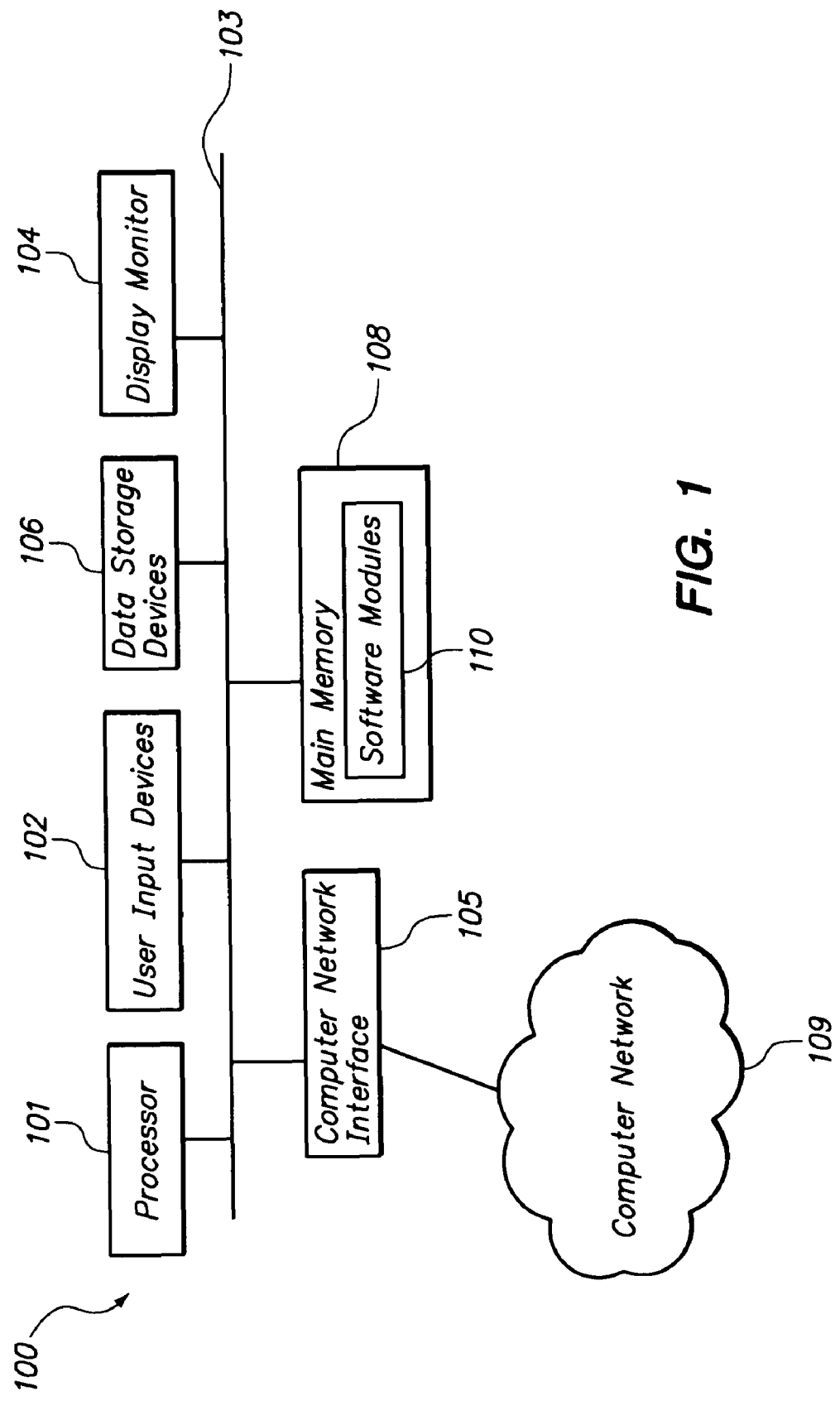
FIG. 1 shows a schematic diagram of a computer in accordance with an embodiment of the present invention.

Referring now to FIG. 1, there is shown a schematic diagram of a computer 100 in accordance with an embodiment of the present invention. The computer 100 may be employed as a computer 201, 221, or 251 (see FIG. 2), for example. The computer 100 may have less or more components to meet the needs of a particular application. The computer 100 may include a processor 101, such as those from the Intel Corporation or Advanced Micro Devices, for example. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM).

In the example of FIG. 1, the main memory 108 includes software modules 110, which may be software components of the aforementioned computer 201, 221, or 251. The software modules 110 may be loaded from the data storage device 106 to the main memory 108 for execution by the processor 101. The computer network interface 105 may be coupled to a computer network 109, which in this example includes the Internet.

Figure 2:
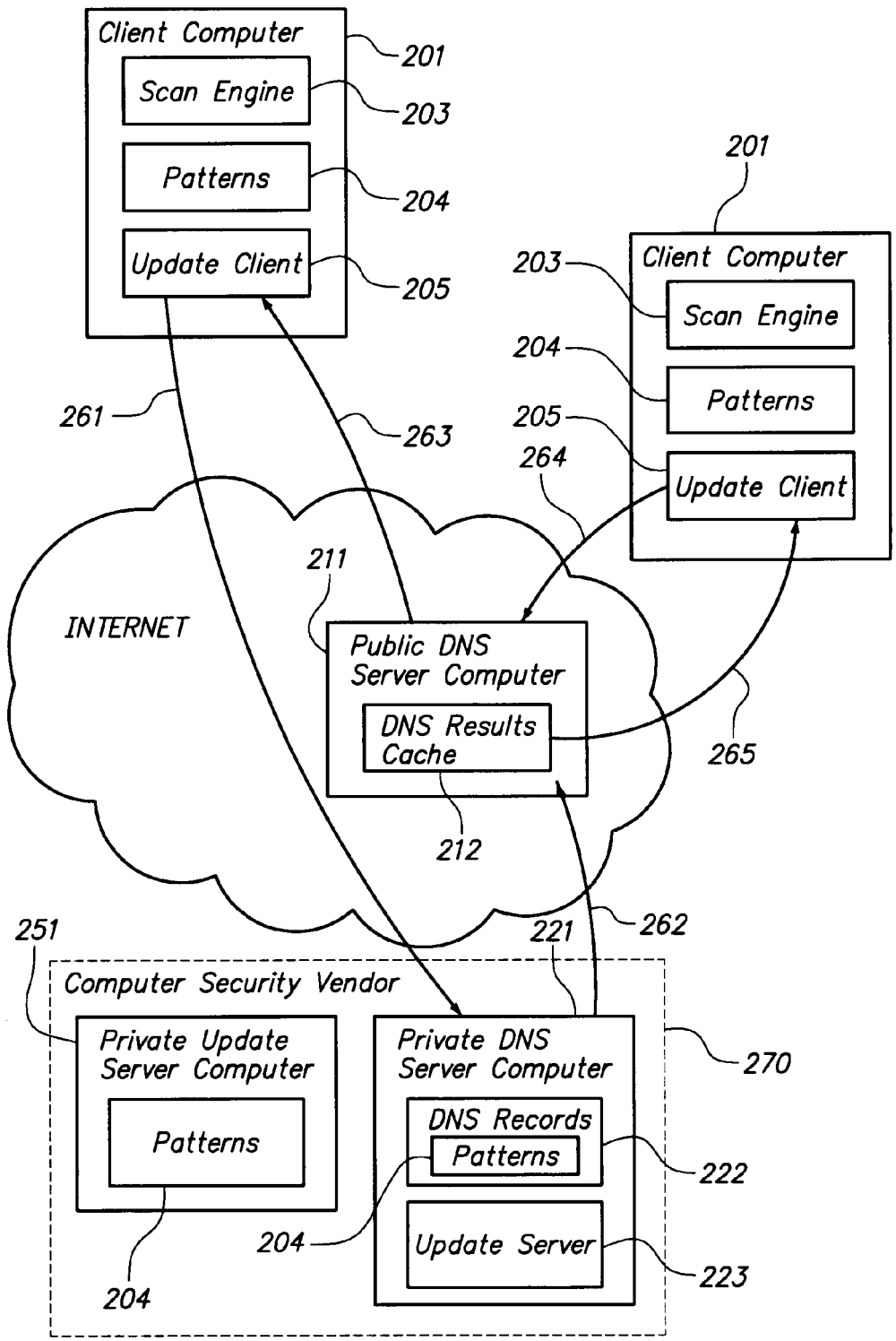
FIG. 2 schematically shows a malicious code pattern update system in accordance with an embodiment of the present invention.

FIG. 2 schematically shows a malicious code pattern update system in accordance with an embodiment of the present invention. There are typically more than one private update server computer 251, private DNS (domain name system) server computer 221, and public DNS server computer 211 available to provide the update service; only one of each is shown in FIG. 2 for clarity of illustration. Similarly, the pattern update system typically provides pattern update service to more than two client computers 201. As shown in FIG. 2, the computers 251, 221, 211, and 201 may communicate with one another over the Internet.

A client computer 201 may include an antivirus comprising a scan engine 203, malicious code patterns 204, and an update client 205. The antivirus in a client computer 201 may be provided by the computer security vendor 270 operating the private update server computer 251 and the private DNS server computer 221. The scan engine 203 may comprise computer-readable program code or hardware logic for scanning data for malicious codes. The malicious code patterns 204 may comprise malicious code patterns and other information for detecting malicious codes. The scan engine 203 may employ the malicious code patterns 204 to perform pattern matching or other conventional algorithms for detecting malicious codes.

The update client 205 may comprise computer-readable program code for updating the malicious code patterns 204. In one embodiment, the update client 205 is configured to receive pattern updates from the private DNS server computer 221 or the public DNS server computer 211 by making DNS queries and receiving results ("DNS results") of the DNS queries. The update client 205 may extract information from the DNS results to update the malicious code patterns 204. In one embodiment, the update client 205 sends out DNS queries to obtain DNS records (also referred to as "resource records") 222. The DNS records 222 may include embedded malicious code patterns 204, which may be extracted by the update client 205 to update the existing malicious code patterns 204 in the client computer 201.

The update client 205 may be configured to receive malicious code patterns 204 from the private server computer 251 (instead of by DNS transaction) when the malicious code patterns 204 in the client computer 201 is too outdated, requires a large update, or when packet losses from DNS transactions are relatively high (e.g., exceeds a threshold determined from historical data or experimentation). For security, the update client 205 may be configured to validate the integrity of received malicious code patterns 204 by checking for digital signatures or checksum, for example. The update client 205 may employ the current malicious code patterns 204 in the client computer 201 until a valid update is received.

The computer security vendor 270 may be a provider of antivirus products, such as Trend Micro, Inc. The computer security vendor 270 may maintain one or more private update server computers 251 and private DNS server computers 221 to provide malicious code pattern updates to antivirus in client computers 201. As will be more apparent below, the private update server computer 251 is configured to provide full (i.e., entire) or relatively large updates for malicious code patterns 204 in cases where the malicious code patterns 204 in a client computer 201 is too outdated to be incrementally updated by DNS transaction. For example, the update client 205 may be configured to receive updated malicious code patterns 204 from the private update server computer 251 by FTP or HTTP in cases where updating by DNS transaction (e.g., from the private DNS server computer 221 or a public DNS server computer 211) would take too much network traffic.

The public DNS server computer 211 may comprise a conventional DNS server publicly available on the Internet. The public DNS server computer 211 may maintain DNS results cache 212 for caching DNS results of successful DNS queries. As will be more apparent below, the contents of the DNS records 222, including malicious code patterns 204 embedded therein, may be cached in the DNS results cache 212 for download to client computers 201. This advantageously allows pattern updates to be received in client computers 201 using publicly available DNS servers, instead of a special pattern update infrastructure.

The private DNS server computer 221 may be configured to distribute updated malicious code patterns 204 by DNS transaction. In one embodiment, the private DNS server computer 221 is a DNS server having fully qualified domain names. This allows the contents of DNS records 222 to be readily obtained using conventional DNS protocol. As is well known, DNS allows for translation of host names to IP (Internet Protocol) addresses to allow computers to be located on the Internet. To locate a particular computer on the Internet, another computer may send a DNS query to a DNS server, which may directly or indirectly (e.g., by forwarding the request to another DNS server) respond to the query with a DNS result including information for locating the particular computer.

The private DNS server computer 221 may further include an update server 223, which may comprise computer-readable program code for creating and maintaining the DNS records 222. In the example of FIG. 2, the update server 223 embeds updated malicious code patterns 204, including information on the number of DNS records 222 containing the malicious code patterns 204, in one or more DNS records 222. Information in the DNS records 222, including updated malicious code patterns 204, may be included in DNS results responsive to DNS queries from update clients 205. The DNS results may also be cached in one or more public DNS server computers 211 (see DNS results cache 212) to minimize response time to DNS queries from update clients 205 and to minimize network bandwidth consumed by the private DNS server computer 221 to provide the update service.

The update client 205 may communicate with the private DNS server computer 221 or the public DNS server computer 211 using the DNS protocol. In one embodiment, the following FQDN format may be used to access the contents of the DNS records 222:

<AC code>.C<chunk number>.V<pattern version>.[P|E|C]<component ID or name>.<region code>.<product name acronym>.frupdate.trendmicro.com.

where, (a) <AC code> is an optional field that may be used for a variety of purposes including verification that the request is coming from a client computer 201 that is subscribed to the update service.

(b) C<chunk number> indicates the chunk number. Since a DNS payload may not have enough room to contain the entirety of typical update, the update server 223 may divide the update in chunks that may be individually transmitted to and re-assembled in a client computer 201 by an update client 205. In one embodiment, the chunk number starts with a "C" and is followed by a sequence number starting from 0. The chunk number may also indicate a Special Index Chunk for providing the most current pattern number. As an example, the chunk number may be P0, P1, P2, P3 . . . P12345.

(c) V<pattern version> indicates the version of the malicious code patterns or component.

(d) [P|E|C]<component ID or name>. This field starts with "P", "E", or "C", which stands for pattern, engine, or component, respectively, depending on the portion of the antivirus being updated. For pattern updates, this field starts with "P". Note that although pattern updates are described here, embodiments of the present invention may also be used to update other components of the antivirus including the scan engine 203. The component ID or name identifies the pattern, engine, or other component being updated. For example, the component ID or name may be the filename of a file being updated.

(e) <region code> is an optional field for updating patterns or other components specific to particular geographical regions.

(f) <product name acronym> is an optional field for identifying a particular product for which the update is provided.

(g) frupdate.trendmicro.com. is the FQDN of the DNS record. This field may be varied for different private DNS server computers 221. "frypdate.trendmicro.com." is shown here merely as an example.

Preferably, each field in the above FQDN format does not exceed 63 characters and starts with [a-z], and the FQDN size does not exceed 255 characters. As an example, the following FQDNs may be used to provide an incremental pattern update broken down into 3 chunks:

c0.v439100.p4.frupdate.trendmicro.corn
c1.v439100.p4.frupdate.trendmicro.com
c2.v439100.p4.frupdate.trendmicro.com Because it is not easily predictable how long a particular DNS server will cache successful DNS results, it is advantageous to keep increasing the component version of the FQDN for new or updated patterns. This prevents downloading of incorrect versions of patterns and also allows for timely updates. For example, once "v439100.p4.frupdate.trendmicro.com" is published, that FQDN should not be reused or withdrawn. Instead, to add, delete, or modify the pattern, it is preferable to release another update using an FQDN with incremented component version number, such as "v439300.p4.frupdate.trendmicro.com" in the just-mentioned example.

In one embodiment, each chunk size is limited to 250 bytes, taking into account DNS-related header information. That is, an FQDN may be configured to carry a maximum of 250 bytes of pattern-related data. Accordingly, to deliver a 4 KB incremental pattern update, the update may be divided into several chunks for delivery to and assembly in the client computer 201. The payload carrying the patterns may be in text format.

In one embodiment, the first chunk "c0" is referred to as an "Index Chunk." An index chunk may be a "Regular Index Chunk" when used to provide information for downloading updated malicious code patterns or a "Special Index Chunk" when used to provide only the latest version number of the malicious code patterns.

In response to a DNS query for an FQDN carrying a Regular Index Chunk, the DNS result may include the Regular Index Chunk in plain text as follows:
{
    Number of chunks that constitutes this pattern: 10 bytes
        Checksum of this pattern: 128 bytes using MD5 hash format Digital signature for the pattern: 48 bytes if signed by DSA
    (Optional Field)
        Decryption key: 10 bytes (OPTIONAL field)
}

Note that the number of chunks indicates the number of DNS records 222 containing the updated pattern. In one embodiment, the size of the Index Chunk may be fixed at 176 bytes with a theoretical maximum of 250 bytes. Using a digital signature is preferred to protect the integrity of the pattern, since the pattern chunks can be downloaded from a public DNS server. Verifying digital signature at the client computer 201 helps avoid DNS poisoning or middle-man-attacks. The decryption key is optional and may be used for ensuring only subscribing client computers 201 receive pattern updates, for example.

In one embodiment, the Special Index Chunk, current, is used to provide the most current (i.e., latest) pattern number. This allows the update client 205 to determine if there is a newer pattern or if its local pattern is too outdated and requires a full pattern download, such as from the private update server computer 251 rather than the private DNS server computer 221. In one embodiment, the component version in the FQDN is omitted when using the Special Index Chunk. For example, to get the latest version of the patterns 204, DNS queries may be made for:

current.p4.frupdate.trendmicro.corn.

The DNS result responsive to the DNS query for the Special Index Chunk may include the following information in plaintext:
{
    Latest version for this component: 10 bytes
}

Caching of the record containing the Special Index Chunk is preferably set to 3 days to allow for periodic updating.

The second and later chunks, c1 c2 c2 . . . , are referred to as data chunks as they carry the actual pattern content. The number of data chunks depends on the size of the pattern, but each chunk may have up to 250 bytes of printable characters using presently available DNS transport. The pattern payload may be encoded by BASE64 since a DNS text record carries printable characters. The data chunks are preferably cached the maximum amount of time possible in the case where the data chunks are incrementally increased rather than withdrawn or overwritten. Example TTL (time to live) for DNS caching is shown in Table 1.

TABLE 1

| Type of Lookup | FQDN | Cache Rate Estimation | Suggested Cache Period | Lookup Frequency |
|---|---|---|---|---|
| Latest Version | current.pX.frupdate.trendmicro.com | Medium | 1 day | Low |
| Index Chunk | c0.pX.frupdate.trendmicro.com | High | 14 days | High |
| Data Chunk | c?.pX.frupdate.trendmicro.com | High | 14 days | High |
| Index Chunk with SSLE | AC.c0.pX.frupdate.trendmicro.com | Very Low | 14 days | Very Low |

As can be appreciated, the Cache Rate estimation may depend on the actual cache settings and storage size of the particular DNS servers involved.

An example pattern update process in accordance with an embodiment of the present invention is now explained with reference to FIG. 2. An update client 205 initiates updating of malicious code patterns 204 in a client computer 201 by making a DNS query for DNS records 222 (arrow 261). Because the DNS records 222 have not been published in this example, the DNS query is eventually received by the private DNS server computer 221. In response to the DNS query, the private DNS server computer 221 sends out DNS results including information from the DNS records 222, such as the patterns 204 (arrow 262). The DNS query-response cycle may be performed several times to provide the entirety of the patterns 204 by chunks to the client computer 201. The DNS results may be cached by the public DNS server computer 211 through which the DNS results are forwarded (arrow 263). As can be appreciated, this allows the patterns 204 to be made available from public DNS servers, effectively using these public DNS servers for storage and caching of malicious code patterns. This advantageously makes the patterns readily available for download from a variety of sources without having to create and maintain special infrastructures for pattern downloads. Continuing the example, the next time another client computer 201 makes a DNS query (arrow 264) to obtain updated patterns, the DNS results may be provided by the public DNS server computer 211 from its DNS results cache 212 (arrow 265).

FIG. 3, which consists of FIGS. 3A and 3B, shows a flow diagram of a method 300 of obtaining updated malicious code patterns for an antivirus in accordance with an embodiment of the present invention. The method 300 is explained using the components shown in FIG. 2 as an example. Other components may also be used without detracting from the merits of the present invention. The method 300 may be performed by an update client 205 in a client computer 201. FIG. 3 includes particular examples and annotations for ease of understanding, not as limitations.

The method 300 begins with the update client 205 obtaining the version of the currently existing malicious code patterns 204 locally stored in the client computer 201 (step 301). The update client 205 may do so by simply inspecting the files containing the malicious code patterns 204, for example. This is a typical case as an antivirus would usually come with a set of malicious code patterns 204. The update client 205 is included with the antivirus to allow for updating of the malicious code patterns 204 upon installation in the client computer 201 and periodically thereafter.

The update client 205 performs a DNS Lookup for the next possible pattern version number, such as by adding a predetermined number (e.g. two) to the pattern version number of the existing malicious code patterns 204 (step 302). For example, the update client 205 may perform a DNS query for DNS record 222 of the FQDN of the Regular Index Chunk. Assuming the DNS record 222 of the Regular Index Chunk is found and no encryption is required, the update client 205 receives the DNS record 222 of the Regular Index Chunk and determines the number of data chunks comprising the updated patterns 204 (step 303 to step 304). The update client 205 makes additional DNS queries to obtain the DNS records 222 for the data chunks to receive the data chunks in the client computer 201 (step 305). The update client 205 extracts the chunks of updated patterns from the payload of the DNS records 222 (see 306) and combines the chunks into the updated malicious code patterns 204 (step 307). The client 205 verifies the integrity of the received updated malicious code patterns 204 (e.g., by digital signature or checksum) and, if the updated malicious code patterns 204 are valid, merges the updated and currently existing malicious code patterns 204 together (step 308 to step 309). The update client 205 may need to repeat the update cycle (see arrow 311 from loop 310) if the locally available malicious code patterns 204 are behind several updates.

The update process may optionally employ encrypted communication for server side license enforcement (SSLE). In that case, the update client 205 checks for a valid license to access the decryption key to be able to read responsive DNS records 222 (step 303 to step 313).

In some cases, there is no responsive DNS record for the next possible pattern version number because the currently existing patterns 204 may be too outdated. In that case, the update client 205 may perform a DNS lookup for the DNS record containing the most current pattern version number (step 303 to step 314). For example, the update client 205 may send a DNS query for the DNS records 222 of the Special Index Chunk. Assuming the DNS record 222 for the Special Index Chunk is found, the update client 205 reads the latest pattern version number (step 316) and compares it to the version number of the currently existing malicious code patterns 204 in the client computer 201. If the currently existing malicious code patterns 204 are too outdated to be incrementally updated, the update client 205 may have to obtain the full updated malicious code patterns 204 (step 317 to step 318) by FTP or HTTP, instead of DNS lookup, for example. The update client 205 may obtain a full pattern update from the private update server computer 251. The update client 205 may also obtain a full pattern update from the private update server computer 251 when the DNS records 222 of the Special Index Chunk cannot be found (step 315 to step 318). No pattern update is required when the version number of the currently existing malicious code patterns 204 is the current version as indicated in the DNS records 222 of the Special Index Chunk.

Figure 4:
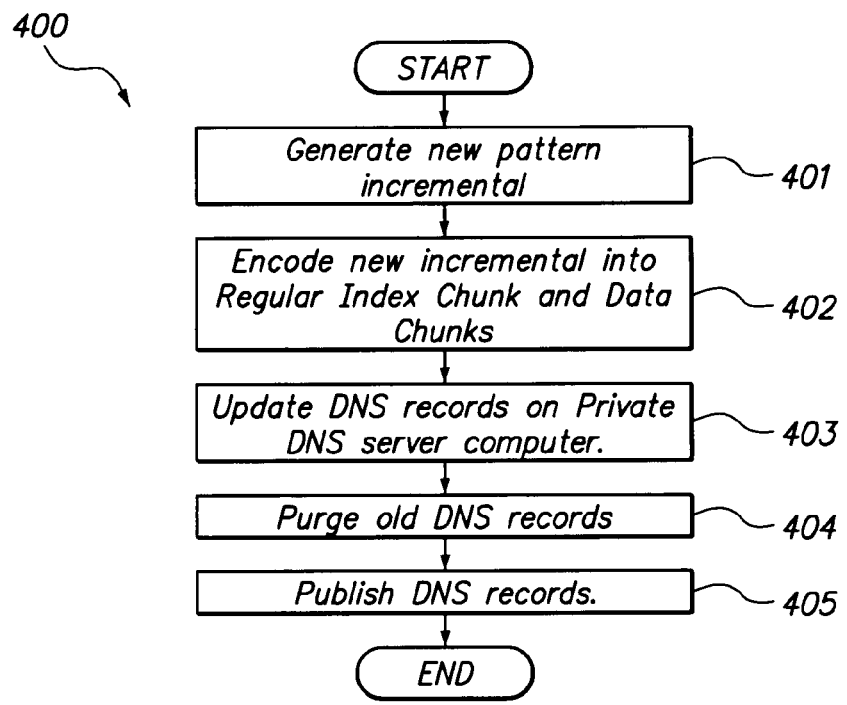
FIG. 4 shows a flow diagram of a method of providing malicious code pattern updates in accordance with an embodiment of the present invention.

Referring now to FIG. 4, there is shown a flow diagram of a method 400 of providing malicious code pattern updates in accordance with an embodiment of the present invention. The method 400 is explained using the components shown in FIG. 2 as an example. Other components may also be used without detracting from the merits of the present invention. The method 400 may be performed in the private DNS server computer 221.

The method 400 begins when new incremental malicious code patterns 204 are generated (step 401). An incremental update replaces portions, rather than the entirety, of currently existing malicious code patterns 204 in client computers 201. The incremental malicious code patterns 204 may be generated by antivirus researchers to combat newly discovered malicious codes. The new incremental malicious code patterns 204 are formed into chunks, such as index chunks and data chunks, for inclusion into DNS records (step 402). The chunk formation may be performed manually or automatically (e.g., by the update server 223) without detracting from the merits of the present invention. The update server 223 may update the DNS records 222 containing the chunks in the private DNS server computer 221 (step 403) and purge the old DNS records 222 (step 404). The update server 223 may then publish the new DNS records 222 (step 405).

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of updating currently existing malicious code patterns of an antivirus in a client computer, the method to be performed by the client computer and comprising:

making a first domain name system (DNS) query for a first DNS record of a first fully qualified domain name (FQDN);

receiving a first DNS result responsive to the first DNS query;

obtaining from a payload of the first DNS result information on obtaining an updated malicious code pattern for the antivirus in the client computer;

making a second DNS query for a second DNS record of a second FQDN;

receiving a second DNS result responsive to the second DNS query; and obtaining from a payload of the second DNS result a portion of the updated malicious code pattern, the updated malicious code pattern being divided into several portions for transmission in several DNS results; and updating the currently existing malicious code patterns in the client computer with a portion of the updated malicious code pattern extracted from the payload of the second DNS result;

wherein the first and second DNS results are cached in a public DNS server computer when the first and second DNS records were published by a private DNS server computer operated for a vendor of the antivirus in the client computer and wherein the first DNS record includes information on a number of portions the updated malicious code pattern has been divided into.

2. The method of claim 1 further comprising:
making additional DNS queries for DNS records of additional FQDN's;
obtaining portions of the updated malicious code pattern from payloads of additional DNS results responsive to the additional DNS queries; and
combining the portions of the updated malicious code pattern back together in the client computer.

3. The method of claim 2 further comprising:
merging the updated malicious code pattern with the currently existing malicious code patterns in the client computer.

4. The method of claim 3 wherein integrity of the updated malicious code pattern is verified prior to merging with the currently existing malicious code patterns in the client computer.

5. The method of claim 4 wherein the integrity of the updated malicious code pattern is verified by checking its checksum.

6. The method of claim 4 wherein the integrity of the updated malicious code pattern is verified by checking its digital signature.

7. The method of claim 1 wherein the first and second DNS results are provided to the client computer by the public DNS server computer.

8. The method of claim 1 wherein the public DNS server computer provides the first and second DNS results to other client computers different from the client computer.

9. The method of claim 1 wherein the portions of the updated malicious code pattern are encrypted.

10. A system comprising a processor for updating malicious code patterns of an antivirus, the system comprising:
a private DNS server computer operated for a vendor of an antivirus and configured to publish contents of DNS records containing portions of an updated malicious code pattern of the antivirus;
a public DNS server computer configured to cache DNS results having payloads containing the contents of the DNS records including the updated malicious code pattern of the antivirus; and
an update client running in a client computer configured to receive DNS results from the public DNS server computer, at least one of the DNS results including information on a number of portions the updated malicious code pattern has been divided into, the update client being configured to extract portions of the updated malicious code pattern from payloads of the DNS results and to use the updated malicious code pattern to update a currently existing malicious code pattern in the client computer.

11. A method of providing malicious code pattern updates, the method comprising:
generating an updated malicious code pattern of an antivirus;
dividing the updated malicious code pattern into several chunks;
including the chunks of the updated malicious code pattern into several DNS records;
publishing contents of the DNS records from a private DNS server operated for a vendor of the antivirus, at least one of the DNS records containing information on a number of chunks the malicious code pattern has been divided into;
in a client computer, receiving DNS results from a public DNS server that cached the contents of the DNS records, the DNS results including the contents of the DNS records; and
updating a current malicious code pattern of an antivirus in the client computer with the updated malicious code pattern extracted from payloads of the DNS results.

12. The method of claim 11 wherein each of the DNS records is accessible using an FQDN.

13. The method of claim 11 wherein at least one record in the DNS records include information on a latest malicious code pattern version number.

* * * * *